US012169969B1

(12) United States Patent
Perkins et al.

(10) Patent No.: US 12,169,969 B1
(45) Date of Patent: Dec. 17, 2024

(54) GEOGRAPHIC ADDRESS QUERY WITH ASSOCIATED TIME OF INQUIRY

(71) Applicant: Insight Terra Inc., Palo Alto, CA (US)

(72) Inventors: Roderick Perkins, Menlo Park, CA (US); Peter Ellenby, Portland, OR (US); Thomas William Ellenby, San Jose, CA (US); Matthew Wong, Palo Alto, CA (US)

( * ) Notice: Subject to any disclaimer, the term of this patent is extended or adjusted under 35 U.S.C. 154(b) by 402 days.

(21) Appl. No.: 17/751,634

(22) Filed: May 23, 2022

Related U.S. Application Data

(63) Continuation-in-part of application No. 17/671,611, filed on Feb. 15, 2022, now abandoned, which is a continuation of application No. 16/055,388, filed on Aug. 6, 2018, now Pat. No. 11,250,264.

(60) Provisional application No. 62/541,655, filed on Aug. 4, 2017.

(51) Int. Cl.
| | |
|---|---|
| *G06K 9/00* | (2022.01) |
| *G06F 16/29* | (2019.01) |
| *G06F 16/58* | (2019.01) |
| *G06F 16/583* | (2019.01) |
| *G06F 16/907* | (2019.01) |
| *G06F 16/9537* | (2019.01) |
| *G06V 20/20* | (2022.01) |

(52) U.S. Cl.
CPC .............. *G06V 20/20* (2022.01); *G06F 16/29* (2019.01); *G06F 16/58* (2019.01); *G06F 16/583* (2019.01); *G06F 16/907* (2019.01); *G06F 16/9537* (2019.01); *G06V 2201/10* (2022.01)

(58) Field of Classification Search
CPC ........ G06F 16/29; G06F 16/58; G06F 16/583; G06F 16/907; G06F 16/9537; G06F 16/9538; G06V 20/20; G06V 2201/10; G06T 19/003; G06T 19/006; G06T 17/05; A63F 13/212; A63F 13/213; A63F 13/30; A63F 13/428; A63F 13/44; G09B 9/00; G09B 9/006
See application file for complete search history.

(56) References Cited

U.S. PATENT DOCUMENTS

| | | | |
|---|---|---|---|
| 10,606,824 B1 * | 3/2020 | Fire ..................... | G06F 16/2365 |
| 11,030,808 B2 | 6/2021 | Prideaux-Ghee et al. | |
| 2016/0063327 A1 * | 3/2016 | Yasutake ................. | G06F 1/163 |
| | | | 345/633 |

* cited by examiner

*Primary Examiner* — Duy M Dang
(74) *Attorney, Agent, or Firm* — Outside GC; Alexander Franco

(57) ABSTRACT

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

20 Claims, 11 Drawing Sheets

US 12,169,969 B1

GEOGRAPHIC ADDRESS QUERY WITH ASSOCIATED TIME OF INQUIRY

RELATED APPLICATIONS

The subject matter of this application is related to U.S. application Ser. No. 16/055,388, filed 2018 Aug. 6, now U.S. Pat. No. 11,250,264 and Provisional Application No. 62/541,655, filed on 2017 Aug. 4, all of which applications are incorporated herein by reference in their entireties.

BACKGROUND OF THE INVENTION

When a user executes a geographic query with a mobile device, either to discover what is at their current location, latitude and longitude, or what they are addressing with their mobile device through the addition of a device's pointing direction to the query gained from a compass reading and/or gyroscopes, the user is usually shown what is being accessed at the time the query reaches the server and the result is then returned to the user. Based on network connectivity, this may take a matter of seconds or even minutes. During this time, the item the user had shown interest in may have changed or moved, and therefore the results to be returned to the user may no longer be relevant.

SUMMARY OF THE INVENTION

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

In one embodiment, a geo-located query that includes the position of a mobile device includes an associated time stamp. The query can include the position and pointing direction of a mobile device. The pointing direction can be a three-dimensional pointing direction.

In one embodiment, query results can include static or dynamic geo-located objects addressed by (e.g. proximate to, pointed to or captured by a camera of) a mobile device, that may have a corresponding real world physical counterpart relating to the associated time stamp to users of Positional Search, Pointing Search, or augmented reality applications on the mobile device.

In one embodiment, the location and/or state of addressed geo-located objects corresponding to a time stamp associated with the query can be provided in response to a query.

A method can be performed by a computer and can include: determining an address state of a mobile device; determining a time associated with the determined address state; subsequent to the determined time, querying a database using the determined address state and the determined time to identify a thing matching the determined address state at the determined time; and based on the querying of the database, presenting to a user information related to a state of the thing at the determined time.

In various embodiment, the method can be performed as follows. The address state can include a physical location of the mobile device. The address state can further include a pointing direction of the mobile device. The address state can further include a field of view of an imaging device associated with the mobile device. The thing can be an object. The information can be presented in an augmented reality interface aligned with a captured image of the object. The information can include a maintenance record for the object. The database can be a database of geolocated objects having time-based states. The querying can include performing a proximity comparison between the location of the mobile device and locations of the geolocated objects. The identified thing can be an electronic billboard displaying different advertisements at different times, and the state of the thing at the determined time can include information related to an advertisement displayed on the electronic billboard at the determined time. The identified thing can be a location, and the state of the thing at the determined time can include an identification of a moveable object present at the location at the determined time. The moveable object can be a person. The moveable object can be a vehicle. The vehicle can be a train and the location can be a train station. The thing can be an event. The event can be selected from a group consisting of: a sporting event, a concert, and a show. The event can be a promotional offer. The method can further include determining that the promotional offer has been presented to fewer than a maximum number of allowed users. The address state can include a velocity of the mobile device. The address state of the mobile device can be determined in response to a user input to the mobile device.

A method performed by a computer system can include: capturing an image with a camera of a spatially aware device; determining an address state of the spatially aware device associated with the capturing; determining a time associated with the determined address state; determining that access to a remote database is unavailable at the determined time; subsequent to the determined time, determining that access to the remote database has become available; in response to determining that access to the remote database has become available, querying the remote database using the determined address state and the determined time to identify a thing captured in the image and having a geographic location matching the determined address state at the determined time; in response to identifying the thing, displaying the image in an interface of the spatially aware device; and within the interface, presenting information related to a state of the thing at the determined time overlaid upon the image in positional relationship to the thing in the image.

The address state can include a physical location of the spatially aware device. The address state can further include a pointing direction of the spatially aware device. The address state can further include a field of view of an imaging device associated with the spatially aware device. The thing can be a physical object. The information can be presented in an augmented reality interface aligned with a captured image of the object. The information can include a maintenance record for the object. The database can be a database of geolocated objects having time-based states. The querying can include performing a proximity comparison between the location of the spatially aware device and locations of the geolocated objects. The identified thing can be a mine tailings dam, and the state of the thing at the determined time can be information related to sensors embedded within the mine tailings dam at the determined time. The identified thing can be a location, and the state of the thing at the determined time can include an identification of a moveable object present at the location at the determined time. The moveable object can be a commercial vehicle. The state of the thing can further include an identification of cargo carried by the commercial vehicle. The state of the thing can further include an identification of a route destination of the commercial vehicle. The state of the thing can further include an identification of a route origin of the commercial vehicle. The commercial vehicle can be configured to periodically report its location to the remote database. The physical location of the spatially aware device can be determined by the spatially aware device. The physical location of the spatially aware device can be a known fixed location. The pointing direction of the spatially aware device can be a determined by the spatially aware device. The pointing direction of the spatially aware device can be a known fixed pointing direction.

A system can include one or more computers having one or more processors and a non-volatile memory, where the non-transitory memory is encoded with computer instructions that can cause the one or more processors to perform the foregoing methods in one or more embodiments.

A non-transitory computer readable medium can be encoded with computer instructions that can cause one or more processors of a system including one or more computers to perform the foregoing methods in one or more embodiments.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

The system can generate accurate and relevant geo-locational query results for users using a multitude of platforms such as location search, augmented reality (AR) and pointing search through the addition of the time stamp to a geo-locational query. The system can make results from geo-located queries submitted with positional, pointing based and AR applications more relevant to users by using this time stamp to confirm what object was addressed at that time and/or a state of the addressed object at the time of query.

An address state of a mobile device at any given moment in time may include any one or more of: position, pointing direction, speed, velocity, acceleration, direction of motion, vibration, and slew rate. If the mobile device has a camera, the address state may also include one or more of: field of view of camera, lens information, and zoom state of camera.

A Time Stamp System ("TSS") may be envisaged as two processes, a capture of a mobile device Time Stamp Address State ("TSAS") by a Time Stamp Capture System ("TSCS"), and a searching of a database of geolocated objects utilizing the captured TSAS to return results relating to geolocated objects that were in that vicinity, direction or field-of-view at that time as they were at that time, by a Time Stamp Recall System ("TSRS"). These two processes may take place at separate times as described in FIGS. 1-3 and related text or one immediately after the other, i.e. as one continuous method, as described in FIG. 4 and related text. The TSCS and the TSRS in combination may also be referred to as a system.

Figure 1:
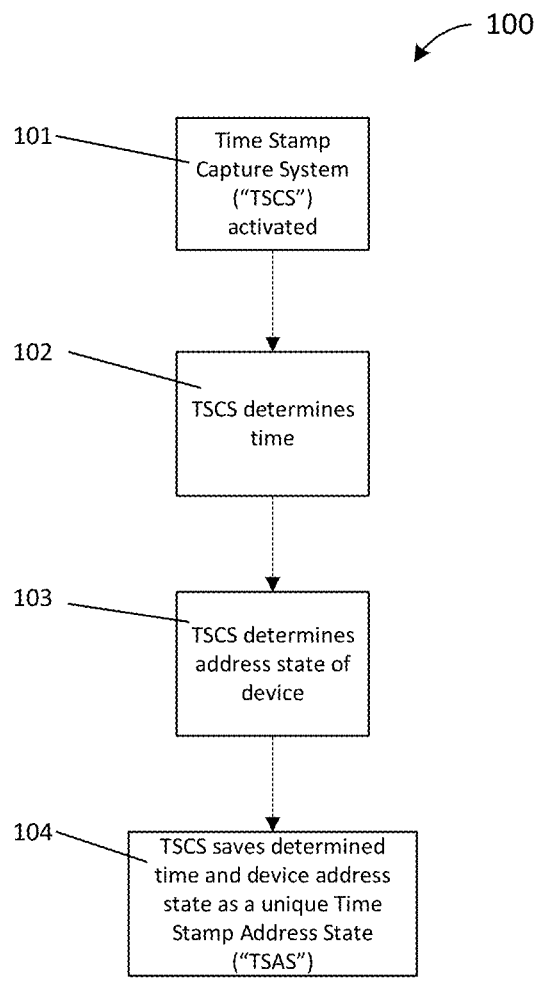
FIG. 1 illustrates a method performed by a system to acquire a Time Stamp Address State ("TSAS") for a mobile device.

FIG. 1 illustrates a method performed by a system to acquire a Time Stamp Address State ("TSAS") for a mobile device. In step 101, a user of the system activates the Time Stamp Capture System ("TSCS"). The flowchart then branches to step 102. In step 102, the system determines the time. The format of the determined time, e.g. UTC, adjusted for local time relative to the location of the mobile device, etc., can be defined by the application. The flowchart then branches to step 103. In step 103, the TSCS determines the address state of the mobile device. The address state can include the determined position in 2 or 3 dimensions of the mobile device. In addition, the address state of a mobile device can include some or all of heading (i.e. pointing direction) in 2 or 3 dimensions, velocity, acceleration, direction of motion, vibration rate, and slew rate and, if the mobile device includes a camera, field of view, lens characteristics and zoom state, and captured image data. The flowchart then branches to step 104. In step 104, the TSCS saves the determined time and device address state as a unique Time Stamp Address State ("TSAS").

Figure 2:
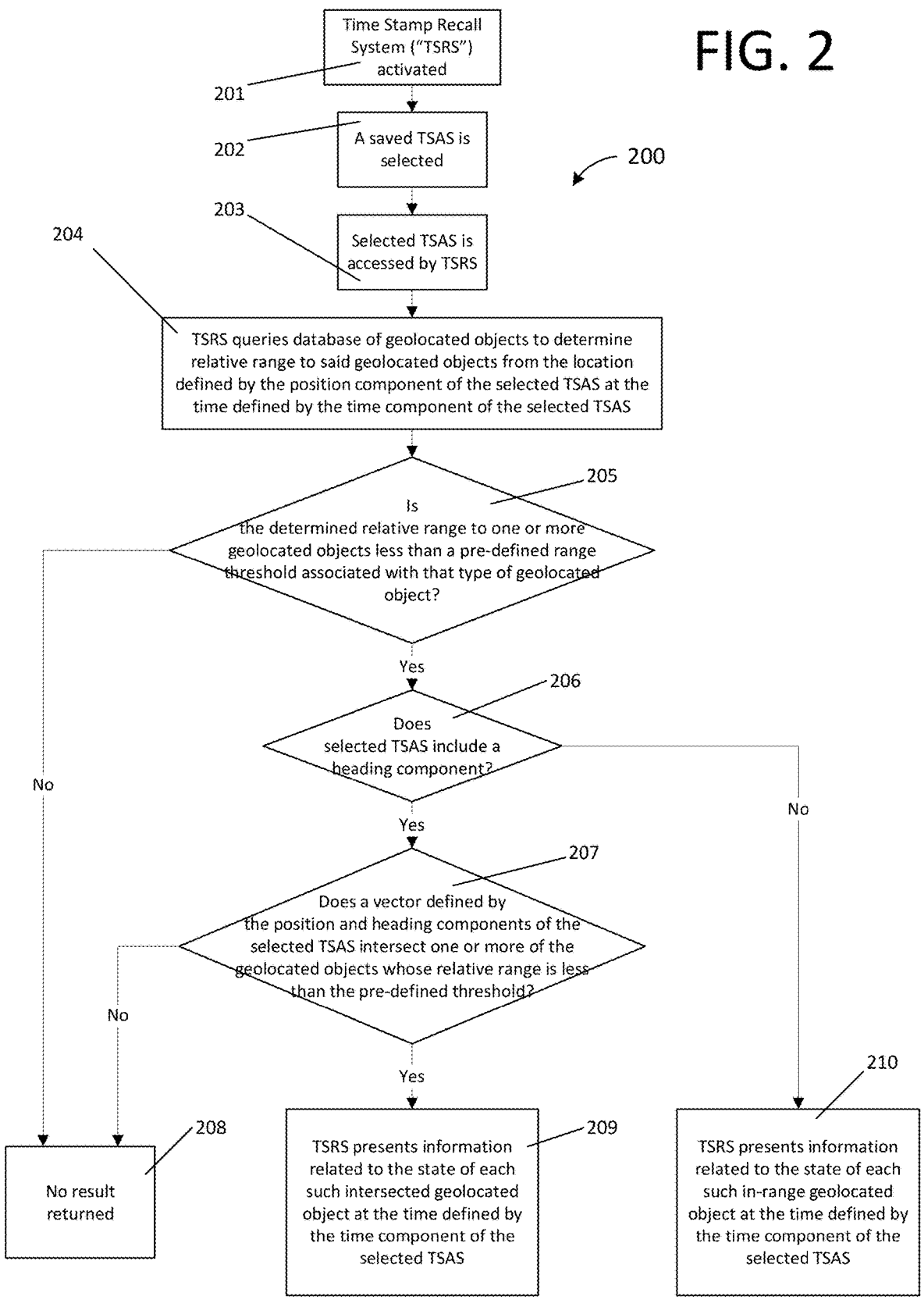
FIG. 2 illustrates a method performed by the system where the TSAS includes time, position and potentially heading components.

FIG. 2 illustrates a method performed by the system where the TSAS includes time, position and potentially heading components. In step 201, the timestamp Recall System ("TSRS") is activated. The flowchart then branches to step 202. In step 202, a saved TSAS is selected either by a user of the system or automatically by the system itself. The flowchart then branches to step 203. In step 203, the selected TSAS is accessed by the TSRS. The flowchart then branches to step 204. In step 204, the TSRS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 205. In step 205, the TSRS determines if the determined range one or more geolocated objects is less than a pre-defined threshold associated with that type of object, i.e. restaurants may have a range threshold of 500 m while mountains may have a range threshold of 10 km. If the range to one or more of the geolocated objects is less than the pre-defined object type specific range thresholds, then the flowchart branches to step 206. If the range to one or more of the geolocated objects is not less than the pre-defined object type specific range thresholds, then the flowchart branches to step 208 in which no result is returned. In step 206, the TSRS determines if the selected TSAS includes a heading component. If the selected TSAS does include a heading component, the flowchart branches to step 207. If the selected TSAS does not include a heading component, the flowchart branches to step 210 in which the TSRS presents information related to the state of each such object within range at the time specified by the time component of the TSAS, i.e. the system returns a time specific result for each object within range. In step 207, the system determines whether a vector defined by the position and heading components of the TSAS intersects one or more of the within range geolocated objects. If one or more of the geolocated objects is intersected by the vector, then the flowchart branches to step 209. If one or more of the geolocated objects is not intersected by the vector, then the flowchart branches to step 208 in which no result is returned. In step 209, the TSRS presents information related to the state of each such object so intersected at the time specified by the time component of the TSAS, i.e. the system returns a time specific result for each object within range that is being "pointed at".

Figure 3:
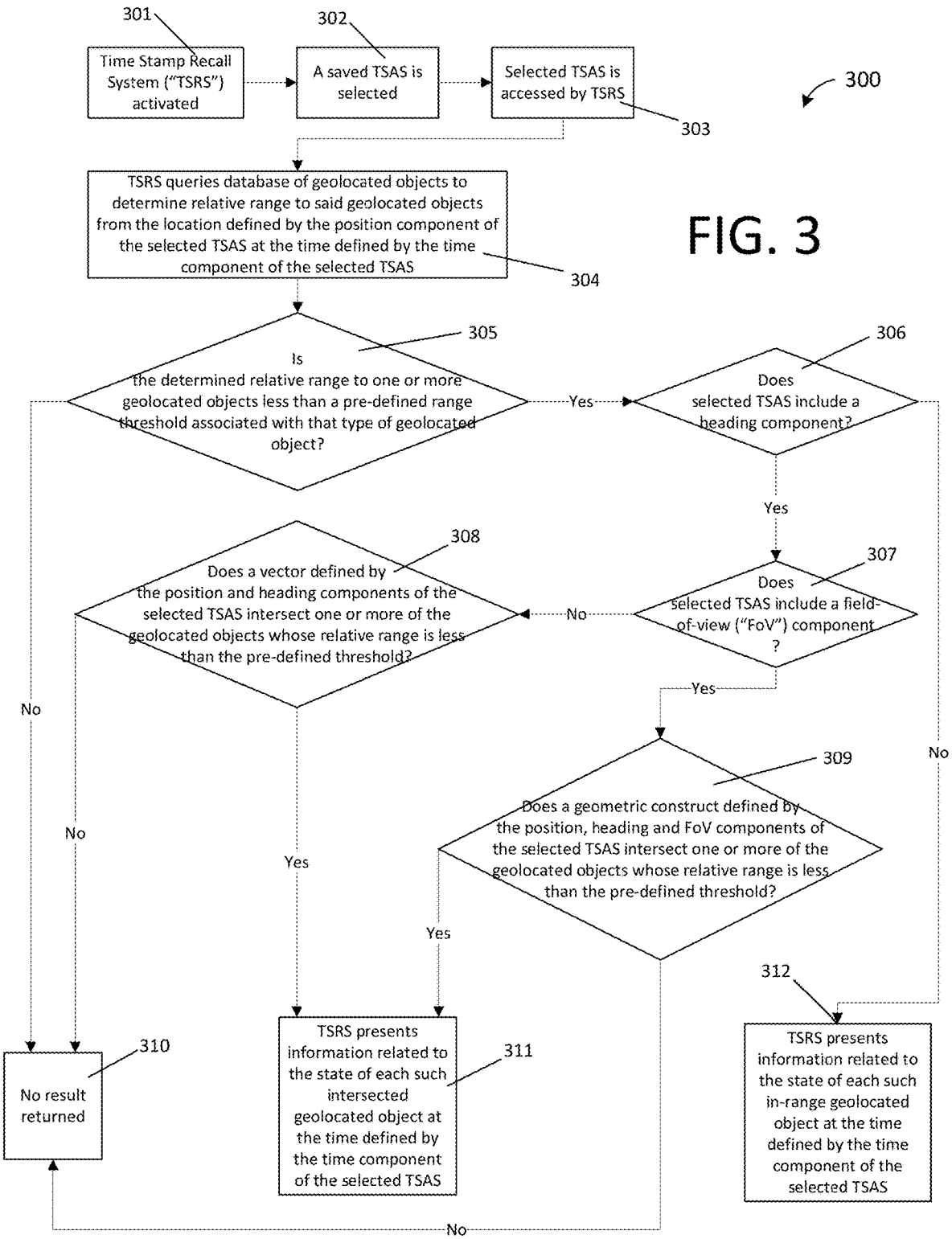
FIG. 3 illustrates a method performed by the system where the TSAS includes time, position and potentially heading and field-of-view components.

FIG. 3 illustrates a method performed by the system where the TSAS includes time, position and potentially heading and field-of-view components. In step 301, the timestamp Recall System ("TSRS") is activated. The flowchart then branches to step 302. In step 302, a saved TSAS is selected either by a user of the system or automatically by the system itself. The flowchart then branches to step 303. In step 303, the selected TSAS is accessed by the TSRS. The flowchart then branches to step 304. In step 304, the TSRS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 305. In step 305, the TSRS determines if the determined range one or more geolocated objects is less than a pre-defined threshold associated with that type of object. If the range to one or more of the geolocated objects is less than the pre-defined object type specific range thresholds, then the flowchart branches to step 306. If the range to one or more of the geolocated objects is not less than the pre-defined object type specific range thresholds, then the flowchart branches to step 610 in which no result is returned. In step 306, the TSRS determines if the selected TSAS includes a heading component. If the selected TSAS does include a heading component, the flowchart branches to step 307. If the selected TSAS does not include a heading component, the flowchart branches to step 312 in which the TSRS presents information related to the state of each such object within range at the time specified by the time component of the TSAS, i.e. the system returns a time specific result for each object within range. In step 307, the TSRS determines whether the TSAS includes a field-of-view ("FoV") component. If the TSAS does include a FoV component, the flowchart branches to step 309. If the TSAS does not include a FoV component, the flowchart branches to step 308. In step 308, the TSRS determines whether a vector defined by the position and heading components of the TSAS intersects one or more of the within range geolocated objects. If one or more of the geolocated objects is intersected by the vector, then the flowchart branches to step 311. If one or more of the geolocated objects is not intersected by the vector, then the flowchart branches to step 310 in which no result is returned. In step 311, the TSRS presents information related to the state of each such object so intersected at the time specified by the time component of the TSAS, i.e. the system returns a time specific result for each object within range that is being "pointed at". In step 309, the TSRS determines if a geometric construct defined by the position, heading and FoV components of the TSAS intersects one or more of the within range geolocated objects. If one or more of the geolocated objects is intersected by the geometric construct, then the flowchart branches to step 311. If one or more of the geolocated objects is not intersected by the vector, then the flowchart branches to step 310 in which no result is returned. In step 311, the TSRS presents information related to the state of each such object so intersected at the time specified by the time component of the TSAS, i.e. the system returns a time specific result for each object within range that is "within view". It should be noted that information relating to the "within view" objects may be overlaid on an image captured at the same time that the TSAS is captured, i.e. the TSAS may further include an image component if the mobile device also includes a camera or may be displayed overlaid on a completely virtual image generated utilizing the various components of the TSAS.

Figure 4:
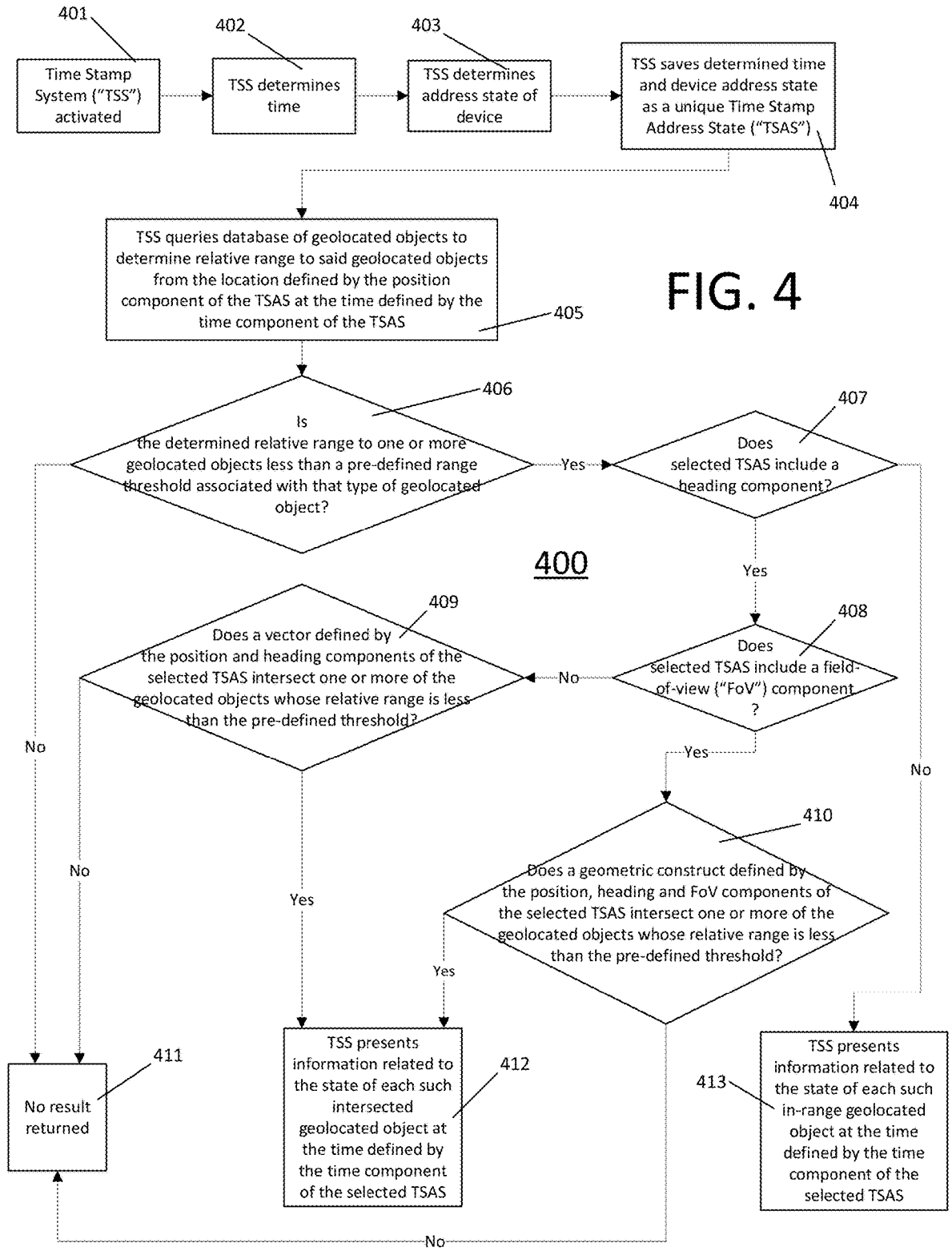
FIG. 4 illustrates a method performed by the system where the TSAS is captured and then utilized to return a result.

FIG. 4 illustrates a method performed by the system where the TSAS is captured and then utilized to return a result. In step 401, the timestamp System ("TSS") is activated. The flowchart then branches to step 402. In step 402, the TSS determines the time. The flowchart then branches to step 403. In step 403, the TSS determines the address state of the mobile device. The address state can include the determined position of the mobile device. In addition, the address state of a mobile device can include some or all of heading (i.e. pointing direction) in 2 or 3 dimensions, velocity, acceleration, direction of motion, vibration rate, and slew rate and, if the mobile device includes a camera, field of view, and lens characteristics and zoom state. The flowchart then branches to step 404. In step 404, the TSS saves the determined time and device address state as a unique Time Stamp Address State ("TSAS"). The flowchart then branches to step 405. In step 405, the TSS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 406. In step 406, the TSS determines if the determined range one or more geolocated objects is less than a pre-defined threshold associated with that type of object. If the range to one or more of the geolocated objects is less than the pre-defined object type specific range thresholds, then the flowchart branches to step 407. If the range to one or more of the geolocated objects is not less than the pre-defined object type specific range thresholds, then the flowchart branches to step 411 in which no result is returned. In step 407, the TSS determines if the selected TSAS includes a heading component. If the selected TSAS does include a heading component, the flowchart branches to step 409. If the selected TSAS does not include a heading component, the flowchart branches to step 413 in which the TSRS presents information related to the state of each such object within range at the time specified by the time component of the TSAS, i.e. the system returns a time specific result for each object within range. In step 408, the TSS determines whether the TSAS includes a field-of-view ("FoV") component. If the TSAS does include a FoV component, the flowchart branches to step 410. If the TSAS does not include a FoV component, the flowchart branches to step 409. In step 409, the TSS determines whether a vector defined by the position and heading components of the TSAS intersects one or more of the within range geolocated objects. If one or more of the geolocated objects is intersected by the vector, then the flowchart branches to step 412. If one or more of the geolocated objects is not intersected by the vector, then the flowchart branches to step 411 in which no result is returned. In step 412, the TSS presents information related to the state of each such object so intersected at the time specified by the time component of the TSAS, i.e. the system returns a time specific result for each object within range that is being "pointed at". In step 410, the TSS determines if a geometric construct defined by the position, heading and FoV components of the TSAS intersects one or more of the within range geolocated objects. If one or more of the geolocated objects is intersected by the geometric construct, then the flowchart branches to step 412. If one or more of the geolocated objects is not intersected by the vector, then the flowchart branches to step 411 in which no result is returned. In step 412, the TSS presents information related to the state of each such object so intersected at the time specified by the time component of the TSAS, i.e. the system returns a time specific result for each object within range that is "within view". It should be noted that information relating to the "within view" objects may be overlaid on an image captured at the same time that the TSAS is captured, i.e. the TSAS may further include an image component, if the mobile device also includes a camera or may be displayed overlaid on a completely virtual image generated utilizing the various components of the TSAS.

Further understanding may be gained from the following examples of the systems and methods of the invention in operation.

Figure 5A:
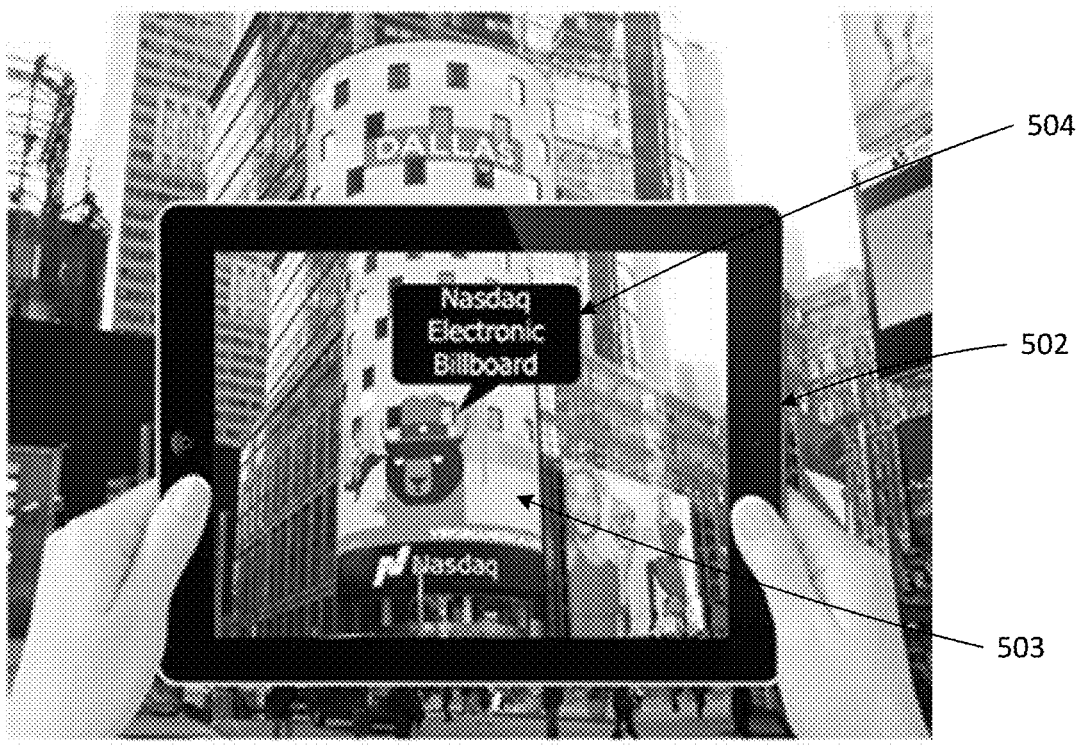
FIGS. 5A and 5B are composite photograph illustrations of a user using an augmented reality application to query information about an electronic billboard.
Figure 5B:

FIGS. 5A and 5B are composite photograph illustrations of a user using an augmented reality application to query information about an electronic billboard. In this example, a mobile device running an augmented reality (AR) application is being used to explore the local area. The user is shown results relating to the content, the state, of the billboard at the time a query is generated as opposed to relating to what may be displayed on the electronic billboard at the time the query is processed. FIG. 5A shows the system in action at the time of the TSAS capture, and FIG. 5B shows the system at the time of the returned result. The AR application running on a tablet 502 utilizes the device's position and pointing direction to determine the object(s) being addressed and layers that information in the form of computer generated graphics over a live camera feed in the device's display. A user of the device notices an electronic billboard 503 in their view with an AR icon 504 hovering over the billboard inviting them to interact and engage with the object. In the illustrated photograph, the electronic billboard being addressed by the device is the non-traditional and actually covers the whole face of the Nasdaq Tower, which is the round building in the foreground. The user of the device is interested in the product currently being displayed on the electronic billboard so they select the icon to interact with the billboard and find out more about the product. Moments after they have selected the icon for the billboard, the item being advertised on the electronic billboard changes. The query they sent to the system contains a time stamp of their inquiry and therefore the results returned to the user relate to the content displayed on the billboard at the time of address and do not relate to the content that is subsequently being displayed when the query is processed by the system. The time stamp of the query is compared to a database that tracks the content and time of display for each advertisement on the electronic billboard, and therefore the advertisement on display at the time of query is the one accessed to generate a response to the user. With this system, a user interacting with an electronic billboard will be shown results 506 relating to the content, i.e. the state, of the billboard at the time of their query and not results relating to what is subsequently or currently being displayed on the electronic billboard 503.

With regard to the example described above and illustrated in FIGS. 5A and 5B, the method illustrated in FIG. 4 may apply as follows. The user of device clicks to save time stamp (step 401). The TSS determines time (step 402). The TSS determines position, heading and FoV data for the mobile device (step 403). The TSS saves the TSAS of the mobile device (step 404). The TSS queries geolocated object database to determine the range to local object and determines that the NASDAQ Billboard geolocated object (object type: physical advertising with range threshold of 500 m) is with range (steps 405 & 406). The TSS determines that TSAS does include heading and FoV components (steps 407 & 408). The TSS determines that NASDAQ Billboard geolocated object is intersected by the geometric construct defined by the time, position, heading and FoV components of the TSAS (step 410). The TSS displays information relating to the NASDAQ Billboard geolocated object (step 412) that was being displayed at the time the TSAS was captured. This information may be displayed aligned to a generated image of the scene as defined by the time, position, heading and FoV components of the TSAS or, if the TSAS also comprises a captured image (i.e. the mobile device also comprises a camera and an image was captured at the time the TSS was activated), the information relating to the NASDAQ Billboard geolocated object may be displayed aligned to this still image. Alternately the time stamped information may itself be displayed as a geolocated object to be viewed dynamically by the AR system whose position is that of the NASDAQ Billboard geolocated object.

A further example of the invention can be understood through a type of geo-located object that often has a changing state, such as the home plate of a baseball diamond and its changing occupants, the batters. For this example, a user uses a pointing search application on a mobile device to enquire about the batter currently at bat at the game the user is attending. A pointing search can use the mobile device's position and pointing direction or orientation to determine the object being addressed or in this case, pointed at by the mobile device. The user points their device towards the home plate, for example, by aligning a predetermined direction of orientation of the device, such as a side edge or a perpendicular to a back side, with the home plate and submits a query. In this instance, the information the user seeks to access, additional information about the current batter, might not be displayed on the scoreboard of the stadium for ready consumption. For example, perhaps the user is interested in the batter's date of birth, minor league experience, and home town. The query can include a time stamp that corresponds to the game's time record, and the time stamp can be utilized to determine when each batter was up to bat at home plate. Once the query is received by the server it in conceivable that the batter the user was inquiring about may not be at bat anymore, e.g. the batter may now be on base, have hit a home run, recorded an out, etc. Without the time stamp attached to the query the user could be given information about the then current batter and not about the batter the user was querying the system about. In this manner, their query is properly responded to.

In a next example, a user is in downtown Las Vegas using a positional application on a mobile device to discover their location and nearby objects. The system determines that the user is on Fremont St. under the domed part of the street where the Fremont Street Experience VivaVision light shows are displayed above the pedestrians surrounded by various casinos. At this moment the user is between the Binion's and Golden Nugget casinos at the corner of Fremont and South Casino Center Boulevard watching the intricate video light show above and listening to the accompanying music that is played through speakers along Fremont St. The current show is a tribute to the band "The Who" and various tracks from the band's career are being played along with a multi-media graphic light show on a curved screen above. The user sees a photo of the band playing live above them on the screen and they wonder who the photographer is that took the photo. They also can't quite place the song being played at that moment and would also like to know the name of the track and possibly purchase it because they like it so much. They submit their locational query to the system with its accompanying time stamp, and the system then compares the query to what was happening in the VivaVision show at the time of the query above the user's location, as distinguished from what may be displayed above the user at the time the query is processed, since the show is very dynamic and may have changed by the time the query is processed. The system also determines what song was being played at the time of the user's query. The system determines that the photo of "The Who" over the user at their time of query was taken by the photographer Jim Marshall and the song being played at the time of query was Slip Kid, from the band's 1975 album, "The Who By Numbers". The user likes the photograph and the song so much that they purchase a print of the photo and the entire album through links to the appropriate merchants provided by the system.

Figure 6A:
FIGS. 6A and 6B are composite photograph illustrations of a user using a positional application to query information about a light rail station.
Figure 6B:

FIGS. 6A and 6B are composite photograph illustrations of a user using a positional application to query information about a light rail station in a next example. FIG. 6A shows the system in action at the time of the TSAS capture, and FIG. 6B shows the time of the returned result. A user is using a positional application 604 on their mobile device 603 to interact with a MAX light rail station in Portland, Oregon. The system determines through the mobile device's positioning system (e.g. GPS, GLONAS) that the user is at the Hollywood MAX station. The user queries the system to find out about the train that is currently in the Hollywood MAX station. The train quickly pulls away and by the time the query is processed by the server, another train, traveling in the opposite direction, now occupies the station. Because the user's query has an attached time stamp, the system can determine what train occupied the station at the time of the query. The user is then shown results 606 relating to the train that occupied the station at the time of the query as opposed to results relating to the train that may be in the station when the query is received and/or processed. The results of the query, therefore, satisfy the demands of the user, and the user learns that the train they inquired about was a Blue Line train traveling towards Gresham.

By way of another example, when one is out and about with a mobile device, it is possible to encounter situations that can drastically alter the speed of one's mobile device's connection to the internet. From 3G, 4G, 4G LTE and different Wi-Fi hotspots, the connection speeds experienced by users, even users in the same location, will rarely be the same. Suppose a company decides to run a promotion based on users interacting with billboards in New York. The company makes it known via social media that at precisely 6 p.m. the first one hundred users to point their mobile device at a specified billboard will receive a special coupon code. As six o'clock comes around, quite a crowd has gathered at the billboard and people are pointing their phones and sending in their entries as soon as the clock strikes 6 p.m. Differing network transmission rates may cause queries to reach the server at different times, and a user who interacted in the proper way with the billboard may have their entry reach the system servers after another user's entry, i.e. a user on a faster network, even though the user submitted it first. By targeting each entry, query or submission with a time stamp relating to the user's time of interaction with the billboard, as opposed to the arrival time at the server, the true first one hundred people to interact with the billboard can be determined. Those users, and not others' whose entries may have reached the server first due to better network connectivity, are justly rewarded with the special coupon code.

Figure 7A:
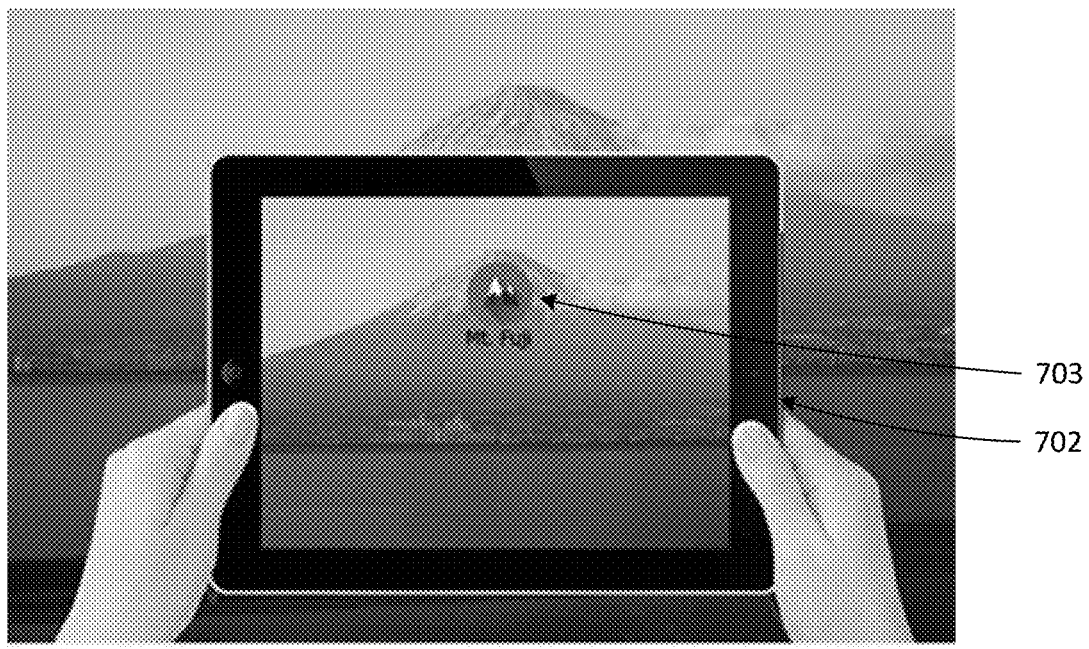
FIGS. 7A and 7B are composite photograph illustrations of a user using an AR application while traveling on a high-speed train to query information about Mt. Fuji.
Figure 7B:
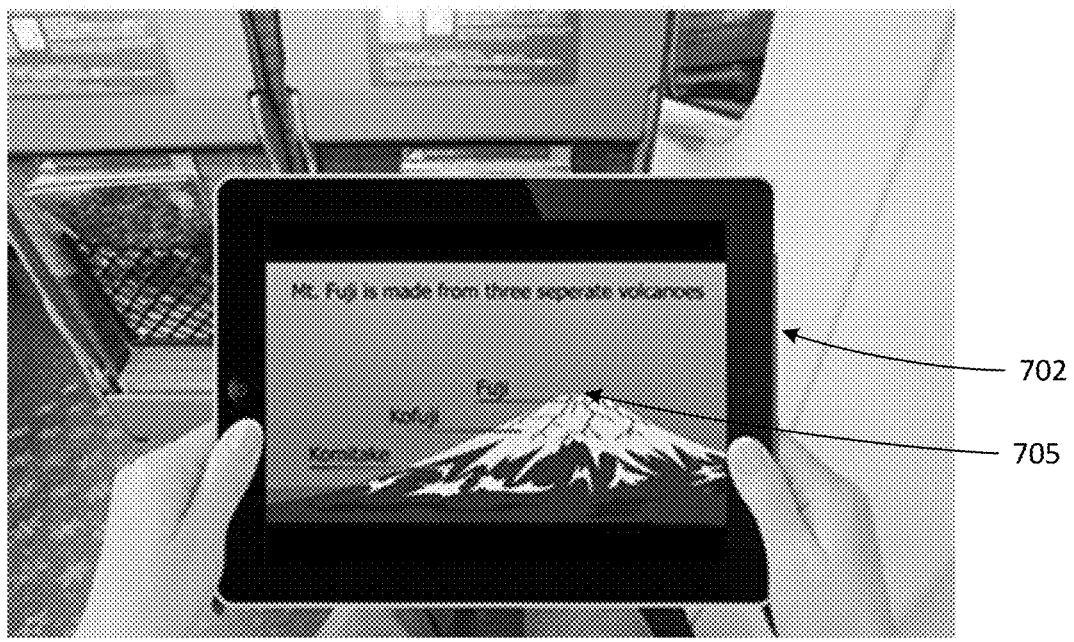

FIGS. 7A and 7B are composite photograph illustrations of a user using an AR application to explore Japan while they travel in a window seat on the high-speed Shinkansen train network, in a next example. FIG. 7A shows the system in action at the time of the TSAS capture to query information about Mt. Fuji, and FIG. 7B shows the returned result. The Shinkansen train network carries trains that regularly travel at speeds of 200 miles per hour, and at 200 MPH, the train can travel five miles in just 1.5 minutes. The AR application, running on a tablet 702, will probably do an excellent job at labeling the surrounding points of interest for the user with AR tags, but if the user seeks to address, interact with and learn about a specific object, the speed of the train and therefore the velocity of the device can make this problematic. AR applications rely on the device being pointed at and viewing an object a user has focused their attention and curiosity on to generate graphics for the user based on these dynamic parameters. It would be beneficial for the system to track the velocity of a user's mobile device, and if the mobile device is traveling at speeds that would make interaction with an addressed object difficult due to the device's speed and therefore the time the object will be in view for the user, it would be of use to generate graphics based on the time stamp relating to the user's query of an object.

Once the user addresses the object, the time stamp of their mobile device's position and orientation at the time of address are used to generate the graphics for the user so they may interact with the object for as long as they wish, not just the time it is in the user's view. In this manner, the user can interact with and learn about the object for a long as they want even if that object is now many miles away. In this example, the user has selected Mt. Fuji 703 as an object they wish to interact with after addressing it with their AR application. Since the time stamp is used for the generation of their interaction with the object, the system no longer needs to rely on the positioning and heading generated by the device as they move along the track, but only the capture state associated with the query's unique time stamp. The user can then learn all about Mt. Fuji, its geology, unique weather patterns and general history through graphics 705 that relate to the user's unique view of the mountain from the train's window when they made their initial query. It may also be the case that the user on the high-speed train wants to enquire about another Shinkansen train traveling in the opposite direction at the same speed with their AR device. Two trains passing at this speed will most likely pass each other in a few seconds, it may not be possible or practical to generate graphics based on a user's relation to the train they have submitted a query about. The system can, however, use the time stamp associated with a user's query to, for example, generate graphics and provide the desired information about the passing train, the destination and the stops along the way, what year it was built and its current speed.

With regard to the example described above and illustrated in FIGS. 7A and 7B, the method illustrated in FIG. 4 may apply as follows. The user of device clicks to save time stamp (step 401). The TSS determines time (step 402). The TSS determines position, heading and FoV data for the mobile device (step 403). The TSS saves the TSAS of the mobile device (step 404). The TSS queries geolocated object database to determine the range to local object and determines that Mt. Fuji (object type: geological point of interest with range threshold of 35 km) is with range (steps 405 & 406). The TSS determines that TSAS does include heading and FoV components (steps 407 & 408). The TSS determines that Mt. Fuji geolocated object is intersected by the geometric construct defined by the time, position, heading and FoV components of the TSAS (step 410). The TSS displays information relating to the Mt. Fuji geolocated objects (step 412). This information may be displayed aligned to a generated image of the scene as defined by the time, position, heading and FoV components of the TSAS or, if the TSAS also comprises a captured image (i.e. the mobile device also comprises a camera and an image was captured at the time the TSS was activated), the information relating to the Mt. Fuji geolocated object may be displayed aligned to this still image.

In another example, a city worker is using an AR application to check the maintenance records and needed repairs for a municipality's network of street lamps. The user is stopped on a block face, is viewing the street lamps on the block face through an AR device and is being shown AR graphics overlaid onto each street lamp relating to the maintenance records for each street lamp. While panning the device along the block face the user is shown AR graphics corresponding to a particular street lamp that is in need of extensive service. The user is informed that there is an instructional graphic AR video to view in order to properly perform the tasks needed for repair. These instructional graphics are generated for the user and shown to them in relation to their unique perspective of the street lamp based on their AR device's position and 3D pointing direction. In this instance, the mobile device can be a ruggedized tablet computer running the AR application and the user is told the video will be roughly 5 minutes long. The user doesn't want to hold the tablet up in the AR viewing state for the street lamp so they generate a time stamp based on the device's initial query about the street lamp. Fully computer-generated graphics are created based on the time stamp and the device's position and 3D pointing direction. These graphics, showing the needed maintenance are generated and the user can then view them by holding the device in any manner desired, one perhaps more comfortable than having the device oriented towards the street lamp for the duration of the maintenance video.

Alternative and Additional Embodiments

An application executing on a spatially aware device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the spatially aware device. A spatially aware device can include any device configured to determine one or more of position, orientation and camera field of view. Examples of spatially aware devices include, for example, mobile phones/devices, GPS/GLONASS enabled sensing or monitoring devices, GPS/GLONASS enabled vehicles, and statically positioned sensing or monitoring devices with established positions and/or orientations.

An address state of a spatially aware device at any given moment in time may include any one or more of: position (either determined by the device or fixed and therefore pre-determined), pointing direction (either determined by the device or fixed and therefore pre-determined), speed, velocity, acceleration, direction of motion, vibration, and slew rate. If the spatially aware device has a camera, the address state may also include one or more of: field of view of camera, lens information, and zoom state of camera.

A system processes the query to return a time-based state of an object and/or location addressed by the spatially aware device at the time of the query. The system can use the time stamp to identify which objects may have been located at a certain location at a certain time and/or to identify the state of located objects at a certain time. For example, the state of sensors embedded within a tailings dam at a mining facility can be determined based on the time of the query. The system can be configured to generate accurate and relevant geo-locational query results for users using a multitude of platforms such as location search, augmented reality (AR) and pointing search through the addition of the time stamp to a geo-locational query. The system can make results from geo-located queries submitted with positional, pointing based and AR applications more relevant to users by using this time stamp to confirm what object was addressed at that time and/or a state of the addressed object at the time of query.

Figures 8A, 8B:
FIGS. 8A and 8B are composite photograph illustrations of a user using an augmented reality application to query information about a mining facility vehicle.

FIGS. 8A and 8B are composite photograph illustrations of a user using a positional application to query information about vehicles present in an open cast mine. FIG. 8A shows the system in action at the time of the TSAS capture, and FIG. 8B shows the time of the returned result. A user is using a positional application 804 on their spatially aware device 803 to interact with a location within an open cast mine. The system determines through the spatially aware device's positioning system (e.g. GPS, GLONASS) that the user is located within the open cast mine along one of the access roads used by vehicles associated with the mine. The user queries the system to find out about the truck currently within the field of view of the user's spatially aware device by capturing an image and utilizing the determined position and orientation, i.e. pointing direction, and field of view of the device. The truck may also be configured as a spatially aware device, such as with GPS location functionality, and it can be configured to report its location over time to a central or cloud based database that is operated by the system. Depending on the availability of wireless connectivity, there may be a delay in when the truck reports its location to the database.

Just as the user initiates the query, the truck quickly pulls away and by the time the query is processed, or by the time the truck is able to report its location, there is no vehicle currently in the field of view of the user's spatially aware device. Because the captured image has an attached time stamp, the system can determine what vehicle was within the field of view of the spatially aware device at the time of the query at a later time. The user is then shown results 806 relating to the specific truck that was within the field of view of the spatially aware device 805 at the time of the query, as opposed to results relating to other vehicles that may be in view, if any, when the query is received and/or processed remotely. The results of the query, therefore, satisfy the demands of the user, and the user learns that the vehicle they inquired about was, for example, Truck #2176A9, a Caterpillar 793F mining truck with a 237-ton payload of iron ore traveling outbound from the mine towards the ore processing center.

With regard to the example described above and illustrated in FIGS. 8A and 8B, the method illustrated in FIG. 4 may apply as follows. The user of device clicks to save time stamp (step 401). The TSS determines time (step 402). The TSS determines position, heading and FoV data for the spatially aware device (step 403). The TSS saves the TSAS of the spatially aware device (step 404). The TSS queries a geolocated object database to determine the range to local object and determines that the geolocated object (object type: vehicle with range threshold of 500 m) is with range (steps 405 & 406). The TSS determines that TSAS does include heading and FoV components (steps 407 & 408). The TSS determines that the geolocated object is intersected by the geometric construct defined by the time, position, heading and FoV components of the TSAS (step 410). The TSS displays information relating to the geolocated object (step 412). This information may be displayed aligned to a generated image of the scene as defined by the time, position, heading and FoV components of the TSAS or, if the TSAS also comprises a captured image (i.e. the spatially aware device also comprises a camera and an image was captured at the time the TSS was activated), the information relating to the geolocated object may be displayed aligned to this still image.

While a spatially aware device may be a fully mobile device capable of registering changes in position and pointing direction, there may be situations where such a device is located at a fixed/pre-surveyed or determined position and/or have the pointing direction of the spatially aware device fixed. An example of such a spatially aware device with a fixed location and potentially a fixed pointing direction would be a hard mounted security camera perhaps within an industrial facility such as a mine or refinery. Additionally, a spatially aware device may include a fixed camera on moving objects such as mining trucks and other facility vehicles, the miners themselves wearing body cams, etc. and the position of the spatially aware device may be determined by the device itself or may be acquired from the determined position of the vehicle or person that the spatially aware device is associated with.

Another novel use of the TSAS would be that of monitoring sensors in industrial areas such as mining, in particular the maintenance and safety of mining tailing dams. If these dams fail, the impact on the local environment and populations can be catastrophic and even deadly. The types of sensors used to monitor the integrity and safety of the tailing dams include Piezometer, Motion, Temperature, Camera, Image Processing Device, Load, Weather Station, Inclinometer, Wave (water), Seismic and Atmospheric. Most such sensors have been placed at a surveyed site and therefore have a known location, usually a latitude, longitude, and altitude. In some cases, such as off-earth asteroid mining, there may be a localized positioning system in use. Hence the location and associated data related to each sensor may be a point of interest (POI) in a locational database. These sensors of course are only useful if they are being monitored and checked regularly. With the TSAS, a worker could traverse (walk, drive, fly, etc.) a tailing dam and query the sensors with a spatial search device such as a spatially aware camera that could capture still images with a known field of view and, given the address state of the device (position, pointing direction, field of view, etc.) at the time of the image capture, overlay data associated with those sensors in the field of view of the device at the time of the image capture to create a time-stamped augmented reality image.

A system such as the TSAS could also serve as a vital system that would be used to verify that the various sensors were being checked and monitored by the mining company over time. It should also be noted that such a confirmation and verification system need not include an imaging system such as a camera, though a camera would add an extra layer of verification, and may simply be a spatially aware "wand" type device or an app on a smart phone that captures the address state of the device and an associated timestamp when "clicked" when the worker points the device at the systems or objects in the facility that need to be regularly checked.

The previous example of the TSAS in operation contemplates a worker using a device that is connected to a wireless network to access the sensor POI database and receive the results of their queries. Many mining facilities and the accompanying tailing dams are often in quite remote areas and, while the sensors themselves may be hard-wired to a central monitoring station etc., wireless network connectivity for mobile devices in the local area may not be consistent or even possible and hence sensor data may not be available wirelessly to workers in the area. To remedy this the same worker would enter the field with a device that was preloaded with the sensor POI database, i.e. just the locations of the sensors and their IDs, thus allowing them to perform their assigned queries (i.e. capturing imagery that encompasses the location of specific sensors) using their spatially aware device without connectivity. The results of each time-stamped query showing the results of each sensor's state and status at the time of query (i.e. at the time the time-stamped image capture) overlaid on the captured image could be displayed to the worker once the worker returned to an area with a wireless data connection, and hence had access to the sensor readings at the times the images were captured, or alternatively may be viewed at a later date and/or time at a remote location by a third party.

It is also possible that connectivity to the sensors be performed without knowledge of the specific locations of each sensor. As the worker traverses the site, each sensor could connect to the worker's device via Bluetooth or other near field communications. This query may be initiated automatically once the worker was in a certain proximity to the sensor. The TSAS system would stamp the time of the query and the state and status of that sensor at the time of query. The results may be displayed immediately on the worker's device or may be stored or uploaded to a central database for use at a later time.

It may also be the case that the query of the sensor POI database is initiated by a geographic search of an area associated with the address state of the worker's spatially aware device and that the data from the sensors within this geographical search area is sent to the worker's mobile device via Bluetooth or other near field communication. For example, a combination of device driven geographic inquiry of a sensor POI database, proximity and near field communication could be utilized to acquire the sensor data and have it time stamped by the TSAS.

By way of another example, when one is out and about with a spatially aware device, it is possible to encounter situations that can drastically alter the speed of one's spatially aware device's connection to the internet. From 3G, 4G, 4G LTE, different Wi-Fi hotspots, radio networks and site-specific data networks, the connection speeds experienced by users, even users in the same location, will rarely be the same.

Figure 9A:
FIGS. 9A and 9B are composite photograph illustrations of a user using an augmented reality application to query information about a mining facility.
Figure 9B:

FIGS. 9A and 9B are composite photograph illustrations of a user using an AR application to observe a tailings containment dam known as "Johnson Dam" at a gold mining facility while in a helicopter, in a next example. FIG. 9A shows the system in action at the time of the TSAS capture to query information about the dam and/or sensors associated with the dam, and FIG. 9B shows the returned result. Helicopters such as the Sikorsky S-76, a very common type used in the industry, have a maximum speed of 178 MPH and therefore the helicopter may potentially travel a considerable distance in just a few minutes. The AR application, running on a tablet 902, will probably do an excellent job at labeling the surrounding points of interest for the user with AR tags but, if the user seeks to address, interact with and learn about a specific object, the speed of the vehicle and therefore the velocity of the device can make this problematic. AR applications rely on the device being pointed at and viewing an object a user has focused their attention and interest on to generate graphics for the user based on these dynamic parameters. It would be beneficial for the system to track the velocity of a user's spatially aware device and, if the spatially aware device is traveling at speeds that would reduce the time an object will be in view and therefor available for user interaction, use a system such as the TSAS to generate graphics based on the time stamp relating to the user's query of an object.

Once the user addresses the object, the time stamp of their spatially aware device's position and orientation at the time of address are used to generate the graphics for the user so they may interact with the object for as long as they wish, not just the time it is in the user's view. In this manner, the user can interact with and learn about the object at their leisure even if that object is now many miles away, or even on the other side of the planet if the survey raw data (e.g. device address state, time stamp and associated image) is uploaded to a head office for later analysis for example. In this example, the user has selected "Johnson Dam" and its related sensors 903 as an object they wish to interact with after addressing it with their AR application. Since the time stamp is used for the generation of their interaction with the object, the system no longer needs to rely on the positioning and heading generated by the device as they move along the track, but only the capture state associated with the query's unique time stamp. A user, in this case in a remote location such as a control center 904 for a mining operation, can then learn about the state of a selected sensor, in this case seismic FJ77002, at the time of the time stamp, its history, etc. through graphics 905 that relate to the user's unique view of the dam from the helicopter when the query was made. It should also be noted that such a system would enable a large area to be surveyed rapidly with the helicopter, reducing fuel hungry hover time and flight time over-all, or alternately the area may be able to be covered in a given time or for a given fuel load the area may be increased. The results of such a survey may then be processed and utilized at a later date.

With regard to the example described above and illustrated in FIGS. 9A and 9B, the method illustrated in FIG. 4 may apply as follows. The user of device clicks to save time stamp (step 401). The TSS determines time (step 402). The TSS determines position, heading and FoV data for the spatially aware device (step 403). The TSS saves the TSAS of the spatially aware device (step 404). The TSS queries a geolocated object database to determine the range to local object and determines that the dam and its associated sensors are within range (steps 405 & 406). The TSS determines that TSAS does include heading and FoV components (steps 407 & 408). The TSS determines that the geolocated objects (dam, sensors, etc.) are intersected by the geometric construct defined by the time, position, heading and FoV components of the TSAS (step 410). The TSS displays information relating to the geolocated objects (step 412). This information may be displayed aligned to a generated image of the scene as defined by the time, position, heading and FoV components of the TSAS or, if the TSAS also comprises a captured image (i.e. the spatially aware device also comprises a camera and an image was captured at the time the TSS was activated), the information relating to the geolocated objects may be displayed aligned to this still image.

In another example, a user is using an AR application to check the maintenance records and needed repairs for fixed infrastructure within a facility, such as water pumps, etc. within a mining facility. The user is viewing the fixed infrastructure elements through an AR device and is being shown AR graphics overlaid onto each infrastructure element relating to the maintenance records for each individual element. While panning the AR device to view the various infrastructure elements, the user is shown AR graphics corresponding to a particular water pump that is in need of extensive service. The user is informed that there is an instructional graphic AR video to view in order to properly perform the tasks needed for repair. These instructional graphics are generated for the user and shown to them in relation to their unique perspective of the pump based on their AR device's position and 3D pointing direction. In this instance, the spatially aware device can be a ruggedized tablet computer running the AR application, and the user is told the video will be roughly 5 minutes long. The user doesn't want to hold the tablet up in the AR viewing state for the pump, so they generate a time stamp based on the device's initial query about the pump. Fully computer-generated graphics are created based on the time stamp and the device's position and 3D pointing direction. These graphics, showing the needed maintenance are generated, and the user can then view them by holding the device in any manner desired, one perhaps more comfortable than having the device oriented towards the pump for the duration of the maintenance video.

There may also be instances that each individual sensor data report has two or more time stamps assigned to it by TSAS. Data that is collected without being viewed and analyzed is not very useful. The TSAS would then also assign a time stamp to the time each sensor report or group/batch of reports was viewed and analyzed either by a person or a computer designed for or allocated to the task, perhaps with some sort of artificial intelligence (AI). For a data report with three time stamps, the stamps might be; 1) time of query, 2) time data delivered to the server, and 3) time viewed by a person or AI. For a data report with four time stamps the stamps might be; 1) time of query, 2) time data delivered to the server, 3) time viewed by AI, and 4) time viewed by a person. It can be imagined that there may be instances where more than four time stamps would be associated with a set of data. Perhaps if further action was taken based upon the data derived by the query was required. The time the decision was made to initiate further action would also be time stamped. In this manner the TSAS provides multiple levels of verification that the dam sensor data is not only being collected but delivered and viewed, and also acted upon. In one embodiment, the TSAS can be configured to assign a physical location, i.e. a position, for all of the follow-on time stamps assigned to a data set, for example, where the server is, where the worker was when they viewed the data etc.

There may be instances when the maintenance of a tailing dam does not involve interactions with sensors, however TSAS would still be of use. For example, we may have a worker whose task is to observe the physical state of the dam looking for potential problems. As they make their rounds, they take photographs of the dam. The camera may be a spatially aware camera, equipped with GPS, inclinometers, gyroscopes, etc. so the geographic field of view of the camera is known, i.e. what part of the dam is in the photograph. It should be noted that most modern smart phones are equipped with a camera and the spatial sensors required to complete this task. Each photograph taken can be time stamped by the TSAS confirming that the worker is completing or has completed the task as assigned and when that task was completed at each stage. These photographs may also be taken by a drone, cameras mounted on other mining assets such as trucks and trains, body cameras on other workers etc. In this manner, a geolocated and time stamped photographic record of the physical state of the dam, or other parts of the mining operation such as mine shafts, quarry's, roads and rails, etc. can be created. These images may be used to create a 3D model of the dam or entire mining operation. Since the geographic field of view for each photograph is known, the images may be augmented with informational graphics relating to sensors or other assets in the field of view at the time the image was captured.

Time Period Stamp (TPS) Reports, the TSAS functioning as a Blockchain, and Final Time Stamp In the case of a drone gathering data from a tailing dam's sensors by overflying the dam via a pre-set route it may be that the drone is only able to fly the dam every few days, perhaps once a week, or longer. In this case, the data from the queried sensors could be transmitted to the drone via Bluetooth or other near field communication when the drone on its pre-set route was within range of the local communications systems related to the sensors. The drone would fly a path covering the entire tailing dam and gather the time stamped sensor data as it completed its route. Since in this instance some time has elapsed since the drone's last data gathering flight, all of the sensor data points taken and recorded by each sensor since the drone's last pass over the dam are transmitted to the drone with the most recent data point receiving a time stamp from the TSAS noting the current state of the sensor. In addition, all of the other data points gathered from the sensor and the most recent reading are time stamped with the time the drone gathered the data, and also a time corresponding to the oldest data point's time of recording, creating a time period stamp (TPS) report for all of the associated data points, i.e. the time period associated with that group of data. Alternatively, the start point of the time period may also be the previous time the sensor or sensors were last accessed. The data will always be associated with this unique TPS report and may be viewed as a whole or as individual data points. The additional time stamps, delivered, viewed, acted upon, etc. are similarly able to be applied to data of a TPS report. The TSAS would be able to apply these additional time stamps to individual data points from the TPS report, or the entirety of data in the TPS report.

The data gathered and time stamped in all previous examples may function like, or may actually be, a blockchain with each time stamped step being verified and reviewable. A blockchain is a growing list of records, called blocks, that are linked together using cryptography and is therefore immutable. Each block contains a cryptographic hash of the previous block, a time stamp, and additional data. The time stamp, in this instance the stamp(s) are provided by the TSAS, therefore proving that the data existed when the block was published in order to get into its hash. As blocks each contain information about the block previous to it, they form a chain with each additional block reinforcing the ones before it. Therefore, blockchains are resistant to modification of their data because once recorded, the data in any given block cannot be altered retroactively without altering all subsequent blocks.

Another example of an additional time stamp that the TSAS could apply to a data point or a TPS report's data could one that indicates that it is the final time stamp that will be assigned to the data. This may be helpful in the instance that a data point needs additional action taken once viewed. Once the desired assigned action is completed, the TSAS may assign a "final" time stamp to the data indicating and verifying that the concern had been resolved. The time stamps assigned to the data may be as follows:

Time recorded
Time gathered

Time delivered

Time viewed

Time acted on

Time finished—Final stamp

Figure 10:
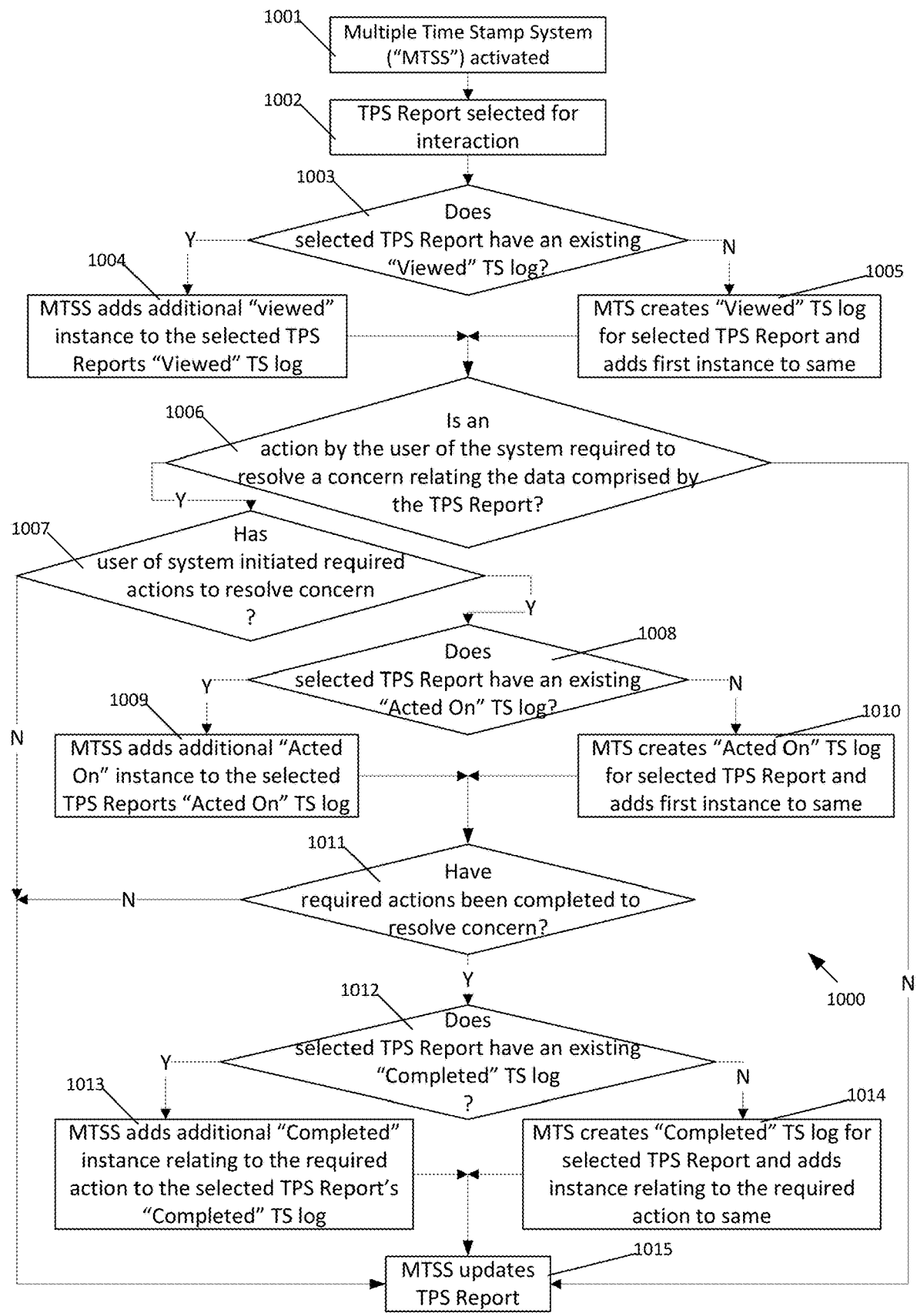
FIG. 10 illustrates a method performed by a system utilizing a Multiple Time Stamp System ("MTSS").

FIG. 10 is a flowchart illustrating a method of a multiple time stamp system such as is described above in operation. For this example, we will take it as given that the TPS Report selected already comprises a "Time Recorded" timestamp (TS) (the specific time or time period that the sensor readings apply to), a "Time Gathered" TS (the specific time when the sensor readings were acquired by the drone, and a "Time Delivered" TS (the specific time when the sensor data was downloaded or transmitted from the drone). In step 1001 the Multiple Time Stamp System ("MTSS") is active. The flowchart then branches to step 1002. In step 1002 the user of the MTSS selects a specific TPS Report. It should be noted that, while not included in this example, the location of the user of the system that is viewing the TPS report could also have a time stamp and be added to the TPS report. The flowchart then branches to step 1003. In step 1003 the system determines if the selected TPS Report has an existing "Viewed" time stamp component. If the selected TPS Report does have an existing "Viewed" time stamp component, the flowchart branches to step 1004 in which an additional "Viewed" instance is added to the "Viewed" log of that TPS Report. The flowchart then branches to step 1006. If the selected TPS Report does not have an existing "Viewed" time stamp component, the flowchart branches to step 1005 in which a "Viewed" TS log is created and the first instance of same is added that TPS Report. The flowchart then branches to step 1006. In step 1006 the system determines if an action by the user is required by the user to resolve a concern relating to the data comprised by the currently selected TPS Report. If an action by the user is required by the user to resolve a concern relating to the data comprised by the currently selected TPS Report, the flowchart branches to step 1007. If an action by the user is not required by the user to resolve a concern relating to the data comprised by the currently selected TPS Report, the flowchart branches to step 1015 in which the current TPS Report is updated to reflect the latest instance of it being viewed by a user of the system. In step 1007, the system determines if the user of the system has initiated the required actions to resolve the concern. If the user of the system has initiated the required actions to resolve the concern, the flowchart branches to step 1008. If the user of the system has not initiated the required actions to resolve the concern, the flowchart branches to step 1015 in which the system updates the current TPS report to reflect the latest instance of being viewed and the fact that a concern relating to this TPS Report is currently unaddressed. In step 1008, the system determines if the selected TPS Report has an existing "Acted On" time stamp component. If the selected TPS Report does have an existing "Acted On" time stamp component, the flowchart branches to step 1004 in which and additional "Viewed" instance is added to the "Acted On" log of that TPS Report. The flowchart then branches to step 1011. If the selected TPS Report does not have an existing "Acted On" time stamp component, the flowchart branches to step 1010 in which an "Acted On" TS log is created and the first instance of same is added that TPS Report. The flowchart then branches to step 1011. In step 1011, the system determines if the required actions have been completed by the user to resolve the concern. If the required actions have been completed by the user to resolve the concern, the flowchart branches to step 1012. If the required actions have not been completed by the user to resolve the concern, the flowchart then branches to step 1015 in which the system updates the current TPS Report to reflect the latest instance of being viewed, the time of initiation of actions to resolve a concern and that the concern is unresolved. In step 1012 the system determines if the selected TPS Report has an existing "Completed" time stamp component. If the selected TPS Report does have an existing "Completed" time stamp component, the flowchart branches to step 1013 in which and additional "Completed" instance is added to the "Completed" log of that TPS Report with associated information relating to the concern that was resolved. The flowchart then branches to step 1015. If the selected TPS Report does not have an existing "Completed" time stamp component, the flowchart branches to step 1014 in which an "Completed" TS log is created and the first instance of same is added that TPS Report. The flowchart then branches to step 1015. In step 1015 the system updates the TPS report.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 11:
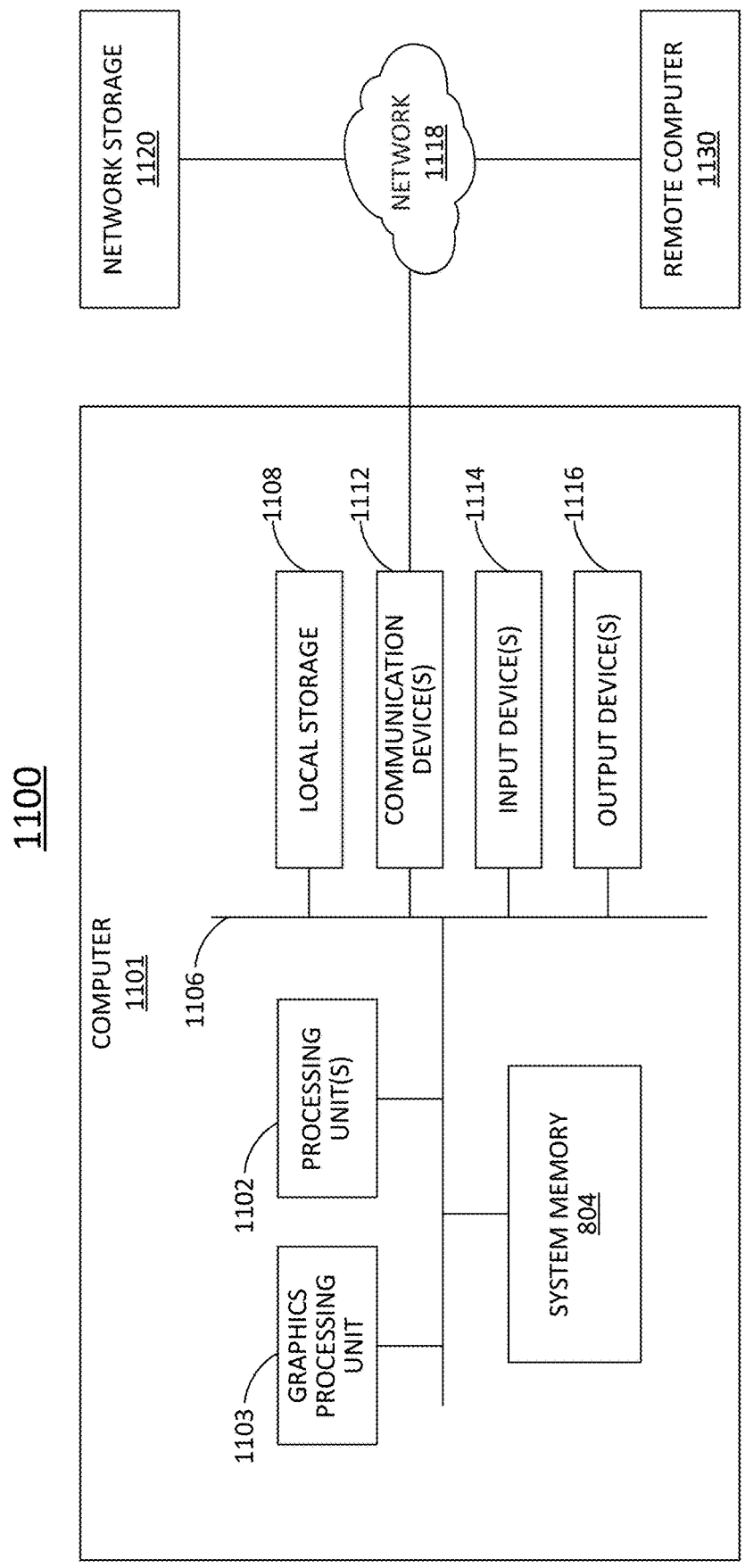
FIG. 11 illustrates a general computer architecture that can be appropriately configured to implement components disclosed in accordance with various embodiments.

FIG. 11 illustrates a general computer architecture 1100 that can be appropriately configured to implement components disclosed in accordance with various embodiments. The computing architecture 1100 can include various common computing elements, such as a computer 1101, a network 1118, and one or more remote computers 1130. The embodiments disclosed herein, however, are not limited to implementation by the general computing architecture 1100. The components and/or computing elements can include, for example, a user mobile device executing a query application and/or a server operating a database and responding to the query.

Referring to FIG. 11, the computer 1101 can be any of a variety of general purpose computers such as, for example, a server, a desktop computer, a laptop computer, a tablet computer or a mobile computing device. The computer 1101 can include a processing unit 1102, a system memory 1104 and a system bus 1106.

The processing unit 1102 can be any of various commercially available computer processors that can include one or more processing cores, which can operate independently of each other. Additional co-processing units, such as a graphics processing unit 1103, also can be present in the computer.

The system memory 1104 can include volatile devices, such as dynamic random access memory (DRAM) or other random access memory devices. The system memory 1104 can also or alternatively include non-volatile devices, such as a read-only memory or flash memory.

The computer 1101 can include local non-volatile secondary storage 1108 such as a disk drive, solid state disk, or removable memory card. The local storage 1108 can include one or more removable and/or non-removable storage units. The local storage 1108 can be used to store an operating system that initiates and manages various applications that execute on the computer. The local storage 1108 can also be used to store special purpose software configured to implement the components of the embodiments disclosed herein and that can be executed as one or more applications under the operating system.

The computer 1101 can also include communication device(s) 1112 through which the computer communicates with other devices, such as one or more remote computers 1130, over wired and/or wireless computer networks 1118. Communications device(s) 1112 can include, for example, a network interface for communicating data over a wired computer network. The communication device(s) 1112 can include, for example, one or more radio transmitters for communications over Wi-Fi, Bluetooth, and/or mobile telephone networks.

The computer 1101 can also access network storage 1120 through the computer network 1118. The network storage can include, for example, a network attached storage device located on a local network, or cloud-based storage hosted at one or more remote data centers. The operating system and/or special purpose software can alternatively be stored in the network storage 1120.

The computer 1101 can have various input device(s) 1114 such as a keyboard, mouse, touchscreen, camera, microphone, accelerometer, thermometer, magnetometer, or any other sensor. Output device(s) 1116 such as a display, speakers, printer, eccentric rotating mass vibration motor can also be included.

The various storage 1108, communication device(s) 1112, output devices 1116 and input devices 1114 can be integrated within a housing of the computer, or can be connected through various input/output interface devices on the computer, in which case the reference numbers 1108, 1112, 1114 and 1116 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

CONCLUSION

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by a computer system, the method comprising:
    capturing an image with a camera of a spatially aware device;
    determining an address state of the spatially aware device associated with the capturing;
    determining a time associated with the determined address state;
    determining that access to a remote database is unavailable at the determined time;
    subsequent to the determined time, determining that access to the remote database has become available;
    in response to determining that access to the remote database has become available, querying the remote database using the determined address state and the determined time to identify a thing captured in the image and having a geographic location matching the determined address state at the determined time;
    in response to identifying the thing, displaying the image in an interface of the spatially aware device; and
    within the interface, presenting information related to a state of the thing at the determined time overlaid upon the image in positional relationship to the thing in the image.

2. The method of claim 1, wherein the address state comprises a physical location of the spatially aware device.

3. The method of claim 2, wherein the physical location of the spatially aware device is determined by the spatially aware device.

4. The method of claim 2, wherein the physical location of the spatially aware device is a known fixed location.

5. The method of claim 2, wherein the address state further comprises a pointing direction of the spatially aware device.

6. The method of claim 5, wherein the address state further comprises a field of view of an imaging device associated with the spatially aware device.

7. The method of claim 5, wherein the pointing direction of the spatially aware device is a determined by the spatially aware device.

8. The method of claim 5, wherein the pointing direction of the spatially aware device is a known fixed pointing direction.

9. The method of claim 1, wherein the thing is a physical object.

10. The method of claim 9, wherein the information is presented in an augmented reality interface aligned with a captured image of the object.

11. The method of claim 10, wherein the information comprises a maintenance record for the object.

12. The method of claim 1, wherein the database is a database of geolocated objects having time-based states.

13. The method of claim 12, wherein the querying comprises performing a proximity comparison between the location of the spatially aware device and locations of the geolocated objects.

14. The method of claim 1, wherein the identified thing is a mine tailings dam, and wherein the state of the thing at the determined time comprises information related to sensors embedded within the mine tailings dam at the determined time.

15. The method of claim 1, wherein the identified thing is a location, and wherein the state of the thing at the determined time comprises an identification of a moveable object present at the location at the determined time.

16. The method of claim 15, wherein the moveable object is a commercial vehicle.

17. The method of claim 16, wherein the state of the thing further comprises an identification of cargo carried by the commercial vehicle.

18. The method of claim 16, wherein the state of the thing further comprises an identification of a route destination of the commercial vehicle.

19. The method of claim 16, wherein the state of the thing further comprises an identification of a route origin of the commercial vehicle.

20. The method of claim 16, wherein the commercial vehicle is configured to periodically report its location to the remote database.

* * * * *